US007735132B2

(12) United States Patent
Brown et al.

(10) Patent No.: US 7,735,132 B2
(45) Date of Patent: Jun. 8, 2010

(54) SYSTEM AND METHOD FOR ENCRYPTED SMART CARD PIN ENTRY

(75) Inventors: Michael K. Brown, Kitchener (CA); Neil P. Adams, Waterloo (CA); Herbert A. Little, Waterloo (CA)

(73) Assignee: Research in Motion Limited, Waterloo (CA)

(*) Notice: Subject to any disclaimer, the term of this patent is extended or adjusted under 35 U.S.C. 154(b) by 1208 days.

(21) Appl. No.: 11/196,340

(22) Filed: Aug. 4, 2005

(65) Prior Publication Data
US 2007/0028118 A1      Feb. 1, 2007

(30) Foreign Application Priority Data
Jul. 29, 2005     (EP) .................................. 05107065

(51) Int. Cl.
*H04L 9/32*     (2006.01)
(52) U.S. Cl. ............................... 726/20; 726/9; 726/28; 713/185; 705/72
(58) Field of Classification Search ........................ None
See application file for complete search history.

(56) References Cited

U.S. PATENT DOCUMENTS

| 4,907,272 | A |   | 3/1990 | Hazard et al. |
| 5,023,908 | A | * | 6/1991 | Weiss .......................... 713/184 |
| 5,036,461 | A | * | 7/1991 | Elliott et al. ................... 705/44 |
| 5,224,163 | A | * | 6/1993 | Gasser et al. ................. 380/30 |
| 5,517,569 | A |   | 5/1996 | Clark |
| 5,721,781 | A |   | 2/1998 | Deo et al. |
| 5,757,918 | A | * | 5/1998 | Hopkins ....................... 705/67 |

(Continued)

FOREIGN PATENT DOCUMENTS

DE     102004045978 A1 *  3/2006

(Continued)

OTHER PUBLICATIONS

"The PC Pay™ System", Innovonics Inc., http://www.innovonics.com/pcpay/pcpayhome.html, publication date unknown, Internet.

(Continued)

*Primary Examiner*—William R Korzuch
*Assistant Examiner*—Michael R Vaughan
(74) *Attorney, Agent, or Firm*—Jenna L. Wilson; Dimock Stratton LLP

(57) ABSTRACT

A smart card, system, and method for securely authorizing a user or user device using the smart card is provided. The smart card is configured to provide, upon initialization or a request for authentication, a public key to the user input device such that the PIN or password entered by the user is encrypted before transmission to the smart card via a smart card reader. The smart card then decrypts the PIN or password to authorize the user. Preferably, the smart card is configured to provide both a public key and a nonce to the user input device, which then encrypts a concatenation or other combination of the nonce and the user-input PIN or password before transmission to the smart card. The smart card reader thus never receives a copy of the PIN or password in the clear, allowing the smart card to be used with untrusted smart card readers.

20 Claims, 2 Drawing Sheets

U.S. PATENT DOCUMENTS

| | | | |
|---|---|---|---|
| 5,778,072 A * | 7/1998 | Samar | 380/30 |
| 5,815,577 A | 9/1998 | Clark | |
| 5,955,717 A | 9/1999 | Vanstone et al. | |
| 6,178,507 B1 | 1/2001 | Vanstone et al. | |
| 6,223,289 B1 * | 4/2001 | Wall et al. | 726/16 |
| 6,460,138 B1 * | 10/2002 | Morris | 713/184 |
| 6,934,855 B1 * | 8/2005 | Kipnis et al. | 726/20 |
| 7,039,809 B1 * | 5/2006 | Wankmueller | 713/182 |
| 7,072,869 B2 * | 7/2006 | Guthery | 705/67 |
| 7,111,324 B2 * | 9/2006 | Elteto et al. | 726/9 |
| 7,246,375 B1 * | 7/2007 | Jean et al. | 726/21 |
| 7,269,732 B2 * | 9/2007 | Kilian-Kehr | 713/172 |
| 2001/0014157 A1 * | 8/2001 | Hashimoto et al. | 380/278 |
| 2002/0018570 A1 * | 2/2002 | Hansmann et al. | 380/270 |
| 2002/0023032 A1 * | 2/2002 | Pearson et al. | 705/35 |
| 2003/0041244 A1 * | 2/2003 | Buttyan et al. | 713/172 |
| 2003/0046560 A1 * | 3/2003 | Inomata et al. | 713/189 |
| 2004/0002923 A1 * | 1/2004 | Ramaswamy et al. | 705/72 |
| 2005/0120202 A1 * | 6/2005 | Cuellar et al. | 713/156 |
| 2005/0177522 A1 * | 8/2005 | Williams | 705/72 |
| 2007/0106892 A1 * | 5/2007 | Engberg | 713/168 |
| 2007/0110282 A1 * | 5/2007 | Millsapp | 382/115 |

FOREIGN PATENT DOCUMENTS

| | | |
|---|---|---|
| FR | 2 536 928 | 6/1984 |
| WO | WO 0122372 A1 * | 3/2001 |

OTHER PUBLICATIONS

"Alphabetical List of Smart Card Products", Timberline Technologies, http://www.timberlinetechnologies.com/products/smart.html, publication date unknown, Internet.

Konigs, H-P. "Cryptographic Identification Methods for Smart Cards in the Process of Standardization" IEEE Communications Magazine, vol. 29, No. 6, Jun. 1991, pp. 42-48.

\* cited by examiner

SYSTEM AND METHOD FOR ENCRYPTED SMART CARD PIN ENTRY

FIELD

This system relates generally to smart cards for authorizing users, and specifically to the encryption of personal identification numbers or passwords utilized to authenticate a user to a smart card.

TECHNICAL BACKGROUND

Smart cards, also referred to as chip cards or integrated circuit cards, are devices with an embedded integrated circuit (such as a microprocessor and/or memory) for use as storage of sensitive data or user authentication. Smart cards may comprise memory for storing financial or personal data, or private data such as private keys used in the S/MIME (Secured Multipurpose Internet Mail Extensions) encryption technique. Preferably, some of this data may be secured using a PIN (personal identification number) or a password as an access control measure. In order to access the protected data stored in the card's memory, a user must be validated by providing the correct PIN or password.

Typically, the smart card does not include a data entry device for direct entry of a PIN or password for the purpose of user authentication. The smart card is typically used in conjunction with a smart card reader that is in communication with an input device. When the smart card is in communication with the smart card reader, a PIN or password may be provided in the clear by the user via the input device to the smart card reader. The reader may then pass the user-entered PIN or password on to the smart card for verification, so that the smart card can authenticate the user.

While this prior art smart card solution is satisfactory for hardware systems that are familiar to the user, such as smart card authentication systems used within a workplace environment where the smart card reader is trusted, such a system presents increased risk outside such environments where the hardware is not trusted. Because the PIN or password is provided by the user to the smart card reader in the clear, the smart card reader has access to this authentication information; the user does not know whether the smart card reader will retain a copy of the PIN or password, or pass the information on to an adversary.

Accordingly, it is desirable to provide a system and method for protecting the user's PIN or password at the time it is entered via the input device to ensure that such sensitive information is not captured or replicated by untrusted hardware.

BRIEF DESCRIPTION OF THE DRAWINGS

In drawings which illustrate by way of example only a preferred embodiment of the invention.

DETAILED DESCRIPTION OF THE PREFERRED EMBODIMENT

Figure 1:
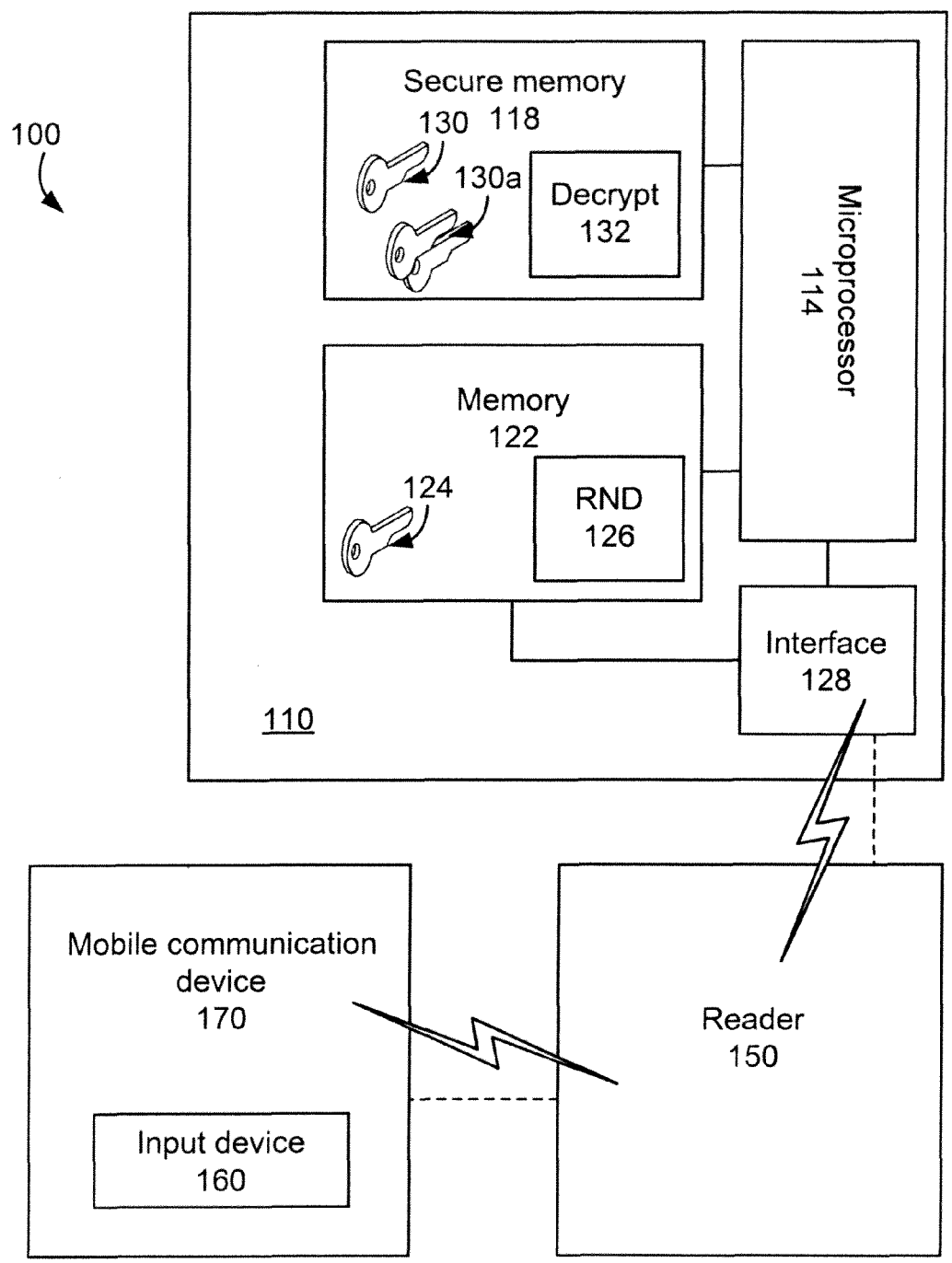
FIG. 1 is a block diagram of a smart card and smart card system.

In accordance with a preferred embodiment, an enhanced smart card is provided for encrypting user-entered authentication data prior to reception by a smart card reader. The smart card comprises a memory for storing a private key, a public key, and predetermined authentication information, at least the private key being stored in a secure memory; an interface for communicating with a smart card reader, transmitting a challenge comprising at least the public key to a user device via the smart card reader, and receiving encrypted authentication information from the user device via the smart card reader, the encrypted authentication information being encrypted by the public key; a processor for executing a decryption algorithm on the received encrypted authentication information using the private key to obtain decrypted authentication information, comparing the decrypted authentication information with the predetermined authentication information, and generating a verification signal if the decrypted authentication information and the predetermined authentication information match.

Preferably, the smart card further comprises a processor and memory for generating and storing a nonce, and the interface is adapted to transmit a challenge comprising at least the public key and the nonce and receive encrypted authentication information wherein the information encrypted comprises the nonce, and the processor for comparing the decrypted authentication information is configured to compare the decrypted information with both the predetermined authentication information and a stored nonce. The interface may also receive, via a smart card reader, a request for authentication from the user device. The private key may be used by the user device in digitally signing or decrypting electronic messages, but the smart card or the user device may further comprise a memory for storing a further private key and a further public key for use in digitally signing or decrypting messages.

In a preferred embodiment, a system for authenticating a user device using a smart card is provided, comprising a smart card comprising a microprocessor and a memory for storing a private key, a public key, and predetermined authentication information, the memory comprising secure memory for storing at least the private key, and the microprocessor being configured to execute a decryption algorithm using the private key and to perform a comparison of the predetermined authentication information against received authentication information; a user device for receiving input from a user, the user device being configured to encrypt input; and a smart card reader for providing communication means between the smart card and the user device; wherein when the smart card is in communication with the user device via the smart card reader, the smart card is configured to transmit to the user device the public key, the user device is configured to encrypt input authentication information from a user using the public key and transmit the encrypted authentication information to the smart card, and the smart card is further configured to decrypt the received encrypted authentication information using the decryption algorithm and the private key such that the microprocessor may perform a comparison of the predetermined authentication information against the received authentication information, and such that the smart card reader never receives or communicates unencrypted authentication information. Preferably the microprocessor is further configured to generate a nonce and store the nonce in memory, such that when the smart card is in communication with the user device via the smart card reader, the smart card is configured to transmit the public key and the nonce, and the user device is configured to encrypt a concatenation of the nonce and input authentication information from a user using the public key and transmit the information thus encrypted to the smart card, and the smart card is further configured to decrypt the received encrypted information using the decryption algorithm and the private key such that the microprocessor may perform a comparison of the predetermined authentication information and the received nonce against the received authentication information and the stored nonce.

Also in a preferred embodiment, a method for authenticating a user device using a smart card is provided, comprising the steps of: providing a smart card comprising a microprocessor and a memory for storing a private key and a public key, the memory comprising secure memory for storing the private key, a decryption algorithm, and predetermined authentication information; transmitting a challenge to a user device, the challenge comprising the public key; receiving from the user device a response comprising received authentication information encrypted using the challenge; decrypting the received authentication information using the private key; comparing the received authentication information against the predetermined authentication information; if the received authentication information matches the predetermined authentication information, transmitting a verification signal to the user device. Preferably, the memory of the smart card is further provided with a nonce generation function, and the method further comprises the step of generating and storing a nonce, such that the step of transmitting a challenge to the user device comprises transmitting a challenge comprising the public key and the nonce, and the step of comparing the received authentication information further comprises a comparison of the stored nonce as well as the predetermined authentication information with the received authentication information.

The method may further comprise the steps of transmitting a request for authentication to the smart card before the step of transmitting a challenge to a user device; prompting a user of the user device to enter authentication information; encrypting, at the user device, the received authentication information using the challenge; transmitting to the smart card the encrypted received authentication information; and receiving a verification signal from the smart card. The user device may comprise a mobile communication device, and the method may further comprise the step of decrypting or digitally signing an electronic message upon receipt of the verification signal from the smart card.

Referring to FIG. 1, a preferred embodiment of a smart card system 100 is shown. The smart card system 100 comprises a smart card 110; a smart card reader 150; and an input device 160. The input device may be comprised in a mobile communication device 170. In the context of a mobile communication device 170, the smart card 110 may be used to authorize certain functions to be carried out by the mobile communication device 170, such as encryption, decryption, and digital signing of messages sent and/or received by the mobile communication device 170. If the input device 160 is comprised in a mobile communication device 170, then the mobile communication device 170 may communicate with the smart card reader 150 either by a direct wired connection, such as via USB (Universal Serial Bus) or by a wireless communication link in accordance with a standard such as the Institute of Electrical and Electronic Engineers (IEEE) 802.11 a/b/g standard for wireless local area networks, Bluetooth®, Zigbee®, and the like, or future standards for wireless, preferably short-range, communication.

As will be appreciated by those skilled in the art, the smart card 110 may be a contact smart card or a contactless smart card. A contact smart card is preferably provided with a physical contact portion in accordance with ISO/IEC 7816 published by the International Organization for Standardization, which contact portion provides a interface with the smart card reader 150 for data communication between the card 110 and the reader 150, and further provides any necessary power to the card itself. Preferably, a contactless smart card is provided in accordance with ISO/IEC 10536, 14443, or 15693, which define standards for close-coupled, proximity, and vicinity smart cards, respectively. Contactless smart cards are not required to maintain physical contact with the reader 150 in order to function, but rather communicate with the reader 150 with an antenna and a radiofrequency interface, and are powered by an electromagnetic field generated at the reader 150. In the following description, the interface of the smart card 110 will be understood to comprise the portion of the smart card, whether a contact or contactless smart card, which carries out the interface functionality of the smart card 110. A typical form factor for the smart card 110 is the "credit card" type form factor, although the smart card 110 may be comprised in another form factor or device that provides the functionality for communication with a smart card reader 150.

In a preferred embodiment, the smart card 110 is provided with a microprocessor 114 in communication with a secure memory 118 and a less secure memory 122. These components may be provided in an ASIC, or in multiple integrated circuits within the smart card 110. The microprocessor 114 is configured to execute any smart card operating system software, and other software applications, and further provides for the execution of various commands, such as memory-related commands to read information from and write information to the secure memory 118 (if the secure memory provided is read/write memory), or the less secure memory 122, which is preferably read/write memory, and security-related commands to perform authentication operations such as password checking. The microprocessor 114 and optionally the less secure memory 122 communicate with an interface 128, which in turn enables the exchange of information between the smart card 110 and the smart card reader 150. The content of the secure memory 122 is not available via the interface to a reader 150 except in accordance with a security-related command executed by the microprocessor 114. The secure memory 122 may be comprised within the microprocessor 114.

The secure memory 118 of the smart card 110 comprises a storage location for a key 130, such as a private key for use in S/MIME decryption or signing. The secure memory 118 further stores a decryption function 132, which is executable by the microprocessor 114, and also authentication information against which user-input authentication information, such as a PIN or password, may be compared in order to authenticate a user to the smart card. Preferably, the PIN or password is not stored in the clear, but rather is stored indirectly (for example, as a hash) in the secure memory 118. The less secure memory 122 stores a public key and/or a certificate containing the public key 124. A nonce generation function 126 may also be stored in the less secure memory 122, for execution by the microprocessor 114.

The smart card 110 is configured such that upon initialization, which takes place when the smart card 110 is activated by a smart card reader 150 and receives sufficient power from the smart card reader 150 to carry out smart card functions, it transmits a challenge comprising the public key 124 to the smart card reader 150. The reader 150 provides the challenge to the input device 160, which in turn is configured to receive from the user authentication information, such as a PIN or a password, for use in authenticating the user to the smart card 110. The input device 160 is further configured to encrypt the authentication information input by the user using the challenge data, i.e., the public key 124. The authentication information thus encrypted is transmitted from the input device 160 to the smart card reader 150, and from the smart card reader 150 to the smart card 110. The encrypted authentication information is passed to the decryption function 132, which accesses the private key 130 to decrypt the encrypted authentication information to obtain the PIN or password input by the user. The smart card 110 then executes a verification command to compare the decrypted authentication information to the previously stored authentication information in the secure memory 118. If the decrypted authentication information matches the previously stored authentication information, then the user is authorized by the smart card 110 and a verification signal is transmitted from the smart card 110 to the input device 160 via the reader 150. As will be appreciated by those skilled in the art, in this embodiment the user may be authenticated by the smart card 110 in communication with any reader 150, whether the reader 150 is trusted or not; the reader 150 at no time is provided with authentication information (i.e., a PIN or password) in the clear.

In a most preferred embodiment, the challenge comprises both the public key 124 and a nonce, which is generated either by the nonce generation function 126 or the microprocessor 114. Thus, the smart card 110 would be configured to generate a challenge upon initialization comprising the public key 124 and the nonce, and further to store the nonce temporarily in memory. The input device 160 would then encrypt the user's entered authentication information using the nonce and the public key 124, for example by concatenating the nonce with the authentication information. The decryption function 132 would then access both the private key 130 and the nonce temporarily stored in memory by the smart card in order to decrypt the received encrypted authentication information during the verification step and determine the user-entered authentication information and the nonce. The smart card 110 would further be configured to utilize the temporarily stored nonce for a single authentication attempt; if the verification step failed, then the smart card 110, if configured to issue a further challenge to the user, would generate a new nonce and transmit this new nonce as part of the further challenge. By incorporating a nonce, the likelihood of a replay attack is minimized; even if a rogue smart card reader 150 captured the encrypted authentication information and a malicious user attempted to replay this encrypted authentication information at a later time, the verification would not be successful.

Figure 2:
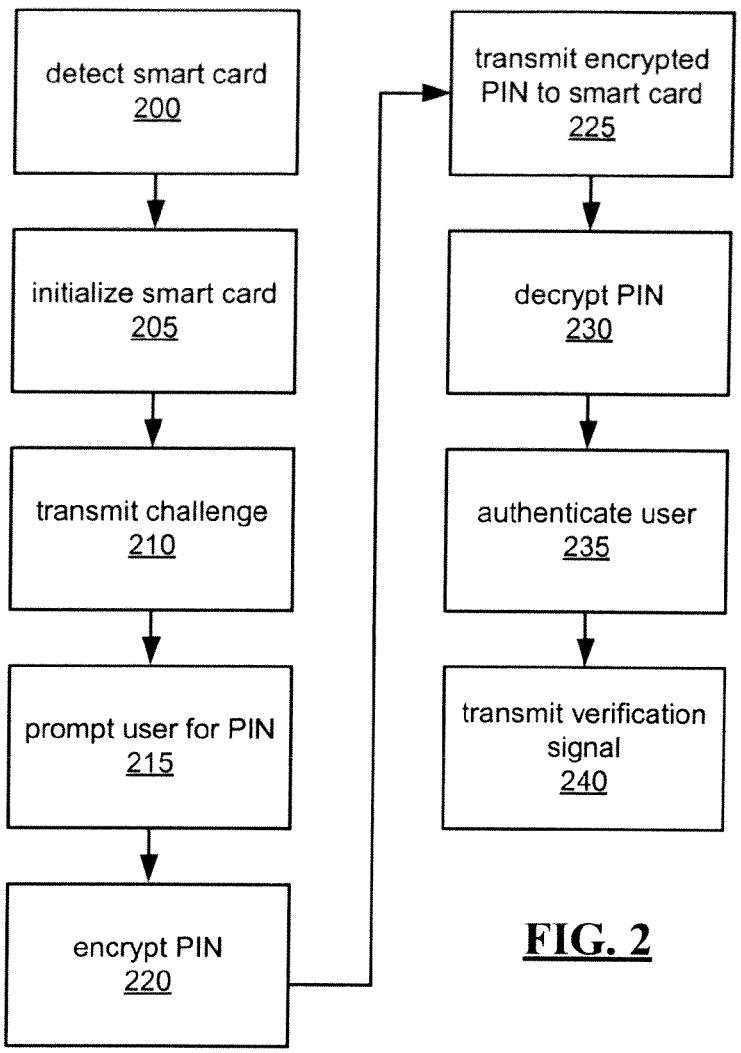
FIG. 2 is a flowchart of a method of authenticating a user using a smart card.

Turning to FIG. 2, a preferred method for authenticating a user using the smart card described above is provided. The smart card 110 is detected by the smart card reader 150 at step 200. The detection may be by means of polling an interface in the smart card reader 150 until a signal is received indicating that a smart card 110 has been activated by the reader 150, and is ready to communicate with the reader 150. The smart card is then initialized at step 205, preferably by the operating system internal to the smart card 110. At step 210, optionally upon receipt of a request for authentication received from the smart card reader 150, the smart card 110 generates a challenge comprising at least the public key 124, but most preferably the public key 124 and a nonce generated using the generation function 126, and transmits this challenge to the smart card reader 150, which in turn signals the input device 160 to request authentication information (e.g., a PIN) from the user at step 215. The input device 160 encrypts the entered authentication information using the challenge at step 220. The encrypted authentication information is then transmitted to the smart card 110 via the reader 150 at step 225, and the smart card 110 decrypts the received encrypted authentication information at step 230 using the private key 130 and compares the decrypted information against the previously stored information on the smart card 110. If the information matches, then the smart card authorizes the user at step 235 and a verification signal is transmitted 240 to the input device 160 via the reader 150.

Figure 3:
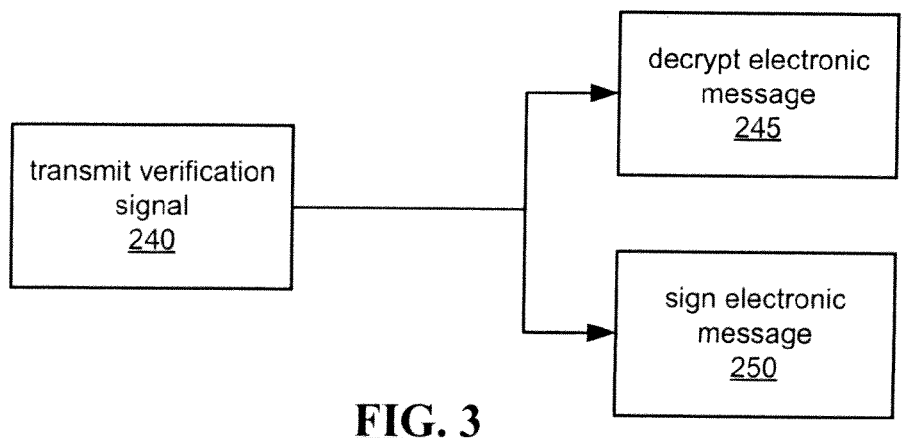
FIG. 3 is a flowchart of a method for decrypting or signing an electronic message.

Such a method may be employed in a system for encrypting and decrypting messages using a mobile communication device 170. The mobile communication device 170 may comprise the input device 160. When a user of the mobile communication device 170 wishes to digitally sign a message to be sent from the device 170, the user activates a smart card 110, causing the mobile device 170 to prompt the user for authentication information in accordance with the method described above. If the user is authenticated, then the mobile communication device 170 is configured to digitally sign the message 250, as shown in FIG. 3. Similarly, when a user of the mobile device 170 in receipt of an encrypted message wishes to decrypt the message, the user may activate the smart card 110, proceed through the authentication process described above, and if the user is authenticated, the mobile communication device 170 is configured to decrypt the message 245. The decryption may make use of further keys 130a stored in the secure memory 118 of the smart card 110, which are provided to the mobile communication device 170 only after the smart card 110 authenticates the user using the public/private key pair 124,130 stored on the card 110. As would be understood by those skilled in the art, the authentication of the user is necessary only when the user wishes to either sign a message 250 or decrypt a message 245, since these activities typically require access to sensitive information, namely, a private key. It is not necessary for the user to be authenticated using the method described above if the user merely wishes to encrypt a message for a recipient, since that encryption may be carried out using the recipient's public key, which may be publicly available. Also, it will be understood that the public/private key pair that is ultimately used by the mobile communication device 170 for decryption or digitally signing a message need not be the same public/private key pair that is used by the smart card 110 to authenticate the user. A public/private key pair that is used by the mobile communication device 170 may be stored in memory resident in the mobile communication device 170, or may likewise be stored in memory on the smart card 110.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method for authenticating by a smart card using a user device in wireless communication with a physically separate smart card reader, the smart card comprising a microprocessor and a memory for storing a private key and a public key, the memory comprising secure memory for storing the private key, a decryption algorithm, and predetermined authentication information, the method comprising the steps of:

transmitting a challenge from the smart card to the user device via the smart card reader over a wireless communication link, the challenge comprising the public key;

receiving at the smart card from the user device via the smart card reader over the wireless communication link, a response to the challenge comprising received user-entered authentication information encrypted using the challenge;

decrypting the received user-entered authentication information using the private key at the smart card;

comparing the received user-entered authentication information with the predetermined authentication information at the smart card; and if the received user-entered authentication information matches the predetermined authentication information, transmitting a verification signal from the smart card to the user device.

2. The method of claim 1, wherein the memory of the smart card is further provided with a nonce generation function, the method further comprising the step of generating and storing a nonce wherein the challenge further comprises the nonce, such that the received user-entered authentication information comprises the nonce comprised in the challenge received by the user device, and wherein the step of comparing the received user-entered authentication information comprises comparing the stored nonce with the nonce comprised in the received authentication information.

3. The method of claim 2, wherein the step of transmitting the challenge to the user device occurs after a request for authentication is received.

4. The method of claim 2, further comprising the steps of:
transmitting a request for authentication to the smart card before the step of transmitting the challenge to the user device;
prompting a user of the user device to enter authentication information;
encrypting, at the user device, the authentication information entered by the user using the challenge;
transmitting to the smart card via the smart card reader the encrypted user-entered authentication information; and
receiving a verification signal from the smart card.

5. The method of claim 4, wherein the user device comprises a mobile communication device, the method further comprising the step of decrypting or digitally signing an electronic message upon receipt of the verification signal from the smart card.

6. The method of claim 5, wherein the step of decrypting or digitally signing an electronic message comprises the step of accessing a second private key for carrying out the decryption or digital signature.

7. The method of claim 1, wherein the step of transmitting the challenge to the user device occurs after a request for authentication is received.

8. The method of claim 1, further comprising the steps of:
transmitting a request for authentication to the smart card before the step of transmitting the challenge to the user device;
prompting for user input of authentication information at the user device;
encrypting, at the user device, the authentication information entered by the user using the challenge;
transmitting to the smart card via the smart card reader the encrypted user-entered authentication information; and
receiving a verification signal from the smart card.

9. The method of claim 8, wherein the user device comprises a mobile communication device, the method further comprising the step of decrypting or digitally signing an electronic message upon receipt of the verification signal from the smart card.

10. The method of claim 9, wherein the step of decrypting or digitally signing an electronic message comprises the step of accessing a second private key for carrying out the decryption or digital signature.

11. The method of claim 1, wherein the user device comprises a mobile communication device.

12. A smart card adapted to authenticate a user at a user device, the smart card comprising:
a memory adapted to store a private key, a public key, and predetermined authentication information, at least the private key being stored in a secure portion of memory;
an interface adapted to communicate with a smart card reader physically separate from the user device, wirelessly transmit a challenge comprising at least the public key to the user device via the smart card reader over a wireless communication link, and receiver encrypted authentication information from the user device over the wireless communication link via the smart card reader in response to the challenge, the encrypted authentication information comprising user-entered authentication information encrypted by the public key; and
a processor adapted to execute a decryption algorithm on the received encrypted authentication information using the private key to obtain decrypted authentication information, compare the decrypted authentication information with the predetermined authentication information, and generate a verification signal if the decrypted authentication information and the predetermined authentication information match.

13. smart card of claim 12, further comprising a processor adapted to generate a nonce for storage in the memory, and wherein the interface is adapted to transmit a challenge comprising at least the public key and the nonce and to receive encrypted authentication information comprising the nonce, and the processor for comparing the decrypted authentication information is configured to compare the decrypted information with both the predetermined authentication information and a stored nonce.

14. The smart card of claim 13, wherein the private key is used by the user device in digitally signing or decrypting electronic messages.

15. The smart card of claim 13, wherein the memory is further adapted to store a second private key and a corresponding second public key, the second private key being usable by the user device in digitally signing or decrypting electronic messages.

16. The smart card of claim 12, wherein the interface is configured to receive, via the smart card reader, a request for authentication from the user device.

17. The smart card of claim 12, wherein the interface is configured to receive, via the smart card reader, a request for authentication from the user device.

18. A system for authenticating a user, the system comprising:
a smart card comprising a microprocessor and a memory for storing a private key, a public key, and predetermined authentication information, the memory comprising secure memory for storing at least the private key, and the microprocessor being configured to execute a decryption algorithm using the private key and to perform a comparison of the predetermined authentication information against received authentication information;
a user device for receiving input from the user, the user device being configured to encrypt input; and
a smart card reader physically separate from the user device and in wireless communication with the user device, for providing communication means between the smart card and the user device;

wherein when the smart card is in communication with the user device via the smart card reader, the smart card is configured to transmit to the user device a challenge comprising the public key, the user device is configured to encrypt, using the public key, authentication information inputted by a user and to transmit the encrypted authentication information to the smart card via the smart card reader in response to the challenge, and the smart card is further configured to decrypt the encrypted authentication information thus received from the user device using the decryption algorithm and the private key to provide decrypted authentication information such that the microprocessor may perform a comparison of the predetermined authentication information against the decrypted authentication information, and such that the smart card reader never receives or communicates unencrypted authentication information.

19. The system of claim 18, wherein the microprocessor is further configured to generate a nonce and store the nonce in memory, such that when the smart card is in communication with the user device via the smart card reader, the smart card is configured to transmit the public key and the nonce, and the user device is configured to encrypt a concatenation of the nonce received from the smart card and the authentication information inputted by the user using the public key and transmit the information thus encrypted to the smart card, and the smart card is further configured to decrypt the encrypted authentication information received from the user device using the decryption algorithm and the private key to provide decrypted authentication information and a decrypted nonce such that the microprocessor may perform a comparison of the predetermined authentication information and the stored nonce against the decrypted authentication information and the decrypted nonce.

20. The system of claim 18, wherein the user device comprises a mobile communication device.

* * * * *

UNITED STATES PATENT AND TRADEMARK OFFICE
CERTIFICATE OF CORRECTION

PATENT NO. : 7,735,132 B2
APPLICATION NO. : 11/196340
DATED : June 8, 2010
INVENTOR(S) : Michael K. Brown, Neil P. Adams and Herbert A. Little It is certified that error appears in the above-identified patent and that said Letters Patent is hereby corrected as shown below:

Column 8, line 30, claim 13 insert --The-- before "smart card".

Signed and Sealed this

Third Day of August, 2010

David J. Kappos
*Director of the United States Patent and Trademark Office*